US010668706B2

(12) United States Patent
Wysocki et al.

(10) Patent No.: US 10,668,706 B2
(45) Date of Patent: *Jun. 2, 2020

(54) DISTRIBUTED SENSING SYSTEM EMPLOYING A FILM ADHESIVE

(71) Applicants: Paul F. Wysocki, Blacksburg, VA (US); Christopher H. Lambert, Blacksburg, VA (US); Carl W. Stoesz, Blacksburg, VA (US)

(72) Inventors: Paul F. Wysocki, Blacksburg, VA (US); Christopher H. Lambert, Blacksburg, VA (US); Carl W. Stoesz, Blacksburg, VA (US)

(73) Assignee: BAKER HUGHES, A GE COMPANY, LLC, Houston, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 15/622,460

(22) Filed: Jun. 14, 2017

(65) Prior Publication Data

US 2017/0274639 A1    Sep. 28, 2017

Related U.S. Application Data

(63) Continuation of application No. 14/077,683, filed on Nov. 12, 2013, now abandoned.

(51) Int. Cl.
*G02B 6/44* (2006.01)
*B32B 37/18* (2006.01)
(Continued)

(52) U.S. Cl.
CPC ............ *B32B 37/18* (2013.01); *G01V 11/002* (2013.01); *G02B 6/4415* (2013.01);
(Continued)

(58) Field of Classification Search
CPC .... G02B 6/443; G02B 6/4415; G02B 6/4434; B32B 37/18; B29C 63/10; B29C 63/06
See application file for complete search history.

(56) References Cited

U.S. PATENT DOCUMENTS 3,717,719 A    2/1973    Smith et al.
4,265,690 A    5/1981    Lowenhar
(Continued)

FOREIGN PATENT DOCUMENTS

EP    0299123 A2    1/1989
EP    1443351 A2    8/2004
(Continued)

OTHER PUBLICATIONS

D.S. McKeehan et al., "Marine Applications for a Continuous Fiber-Optic Strain-Monitoring System, Part II"; Offshore Technology Conference; OTC 5564; Apr. 27, 1987; 10 pages.
(Continued)

*Primary Examiner* — Akm E Ullah
(74) *Attorney, Agent, or Firm* — Cantor Colburn LLP

(57) ABSTRACT

A sensing apparatus includes a sheath, a central member disposed in the sheath, at least one optical fiber disposed with the central member, and a film adhesive disposed between the central member and the sheath, the film adhesive provided in one or more sheets or strips and disposed in one or more layers between the central member and the sheath, and the film adhesive attached to the sheath.

13 Claims, 4 Drawing Sheets

(51) Int. Cl.
  *G01V 11/00* (2006.01)
  *B29C 63/06* (2006.01)
  *B29C 63/10* (2006.01)
(52) U.S. Cl.
  CPC ............ *G02B 6/4434* (2013.01); *B29C 63/06* (2013.01); *B29C 63/10* (2013.01); *G02B 6/443* (2013.01); *Y10T 156/10* (2015.01)

(56) References Cited

U.S. PATENT DOCUMENTS

| | | | |
|---|---|---|---|
| 4,755,020 A * | 7/1988 | Willis | G02B 6/4401 174/110 S |
| 4,755,037 A | 7/1988 | Bjornlie et al. | |
| 4,770,489 A | 9/1988 | Saito et al. | |
| 4,836,872 A | 6/1989 | Landry et al. | |
| 4,936,648 A | 6/1990 | Yamagushi et al. | |
| 4,944,570 A | 7/1990 | Oglesby et al. | |
| 5,274,725 A | 12/1993 | Bottoms, Jr. et al. | |
| 5,344,511 A | 9/1994 | Graefe et al. | |
| 5,509,097 A | 4/1996 | Tondi-Resta et al. | |
| 5,514,080 A | 5/1996 | Blott et al. | |
| 5,848,212 A | 12/1998 | Wagman | |
| 5,942,750 A * | 8/1999 | Sannerhaugen | G01B 11/18 250/227.14 |
| 5,973,783 A | 10/1999 | Goldner et al. | |
| 6,004,639 A | 12/1999 | Quigley et al. | |
| 6,191,414 B1 | 2/2001 | Ogle et al. | |
| 6,324,323 B1 | 11/2001 | Benham | |
| 6,431,767 B2 | 8/2002 | Nagasaki | |
| 6,457,533 B1 | 10/2002 | Metcalfe | |
| 6,480,653 B1 * | 11/2002 | Hulin | G02B 6/4413 385/100 |
| 6,874,361 B1 | 4/2005 | Meltz et al. | |
| 6,947,637 B2 * | 9/2005 | Smith | G01L 1/246 385/12 |
| 7,013,979 B2 | 3/2006 | Richard | |
| 7,212,715 B2 * | 5/2007 | Dallas | G02B 6/4434 385/100 |
| 7,252,437 B2 | 8/2007 | Ringgenberg | |
| 7,318,481 B2 | 1/2008 | Richard | |
| 7,644,773 B2 | 1/2010 | Richard | |
| 7,708,073 B2 | 5/2010 | Richard | |
| 7,792,405 B2 | 9/2010 | Stoesz et al. | |
| 7,903,695 B2 | 3/2011 | Kojima et al. | |
| 7,954,560 B2 | 6/2011 | Mathiszik et al. | |
| 7,983,520 B2 | 7/2011 | Bringuier et al. | |
| 8,111,952 B2 | 2/2012 | Herbst | |
| 8,184,935 B2 | 5/2012 | Kachmar | |
| 8,191,225 B2 | 6/2012 | Richard | |
| 8,326,103 B2 | 12/2012 | Stoesz et al. | |
| 8,443,888 B2 | 5/2013 | Coronado | |
| 8,582,942 B1 * | 11/2013 | Burnett | G02B 6/4434 385/102 |
| 8,620,124 B1 | 12/2013 | Blazer et al. | |
| 8,655,117 B2 * | 2/2014 | Donlagic | G01B 11/18 385/12 |
| 8,681,322 B2 * | 3/2014 | Barry | G01S 17/08 356/3.01 |
| 8,684,075 B2 | 4/2014 | Guest et al. | |
| 8,973,434 B2 | 3/2015 | Albrecht et al. | |
| 9,086,331 B2 * | 7/2015 | Carralero | G01L 1/247 |
| 9,255,822 B2 * | 2/2016 | Stoesz | C09J 7/21 |
| 9,335,502 B1 | 5/2016 | Wysocki et al. | |
| 9,797,795 B2 * | 10/2017 | White | G01L 11/025 |
| 2002/0006254 A1 | 1/2002 | Nagasaki | |
| 2002/0076189 A1 | 6/2002 | McMullin et al. | |
| 2002/0087156 A1 | 7/2002 | Maguire et al. | |
| 2002/0088931 A1 | 7/2002 | Danisch et al. | |
| 2002/0122640 A1 | 9/2002 | Strong et al. | |
| 2002/0129935 A1 | 9/2002 | Castano-Mears et al. | |
| 2002/0131727 A1 | 9/2002 | Reedy et al. | |
| 2002/0178582 A1 | 12/2002 | Echols et al. | |
| 2003/0123828 A1 | 7/2003 | Garito et al. | |
| 2003/0138234 A1 | 7/2003 | Yong | |
| 2004/0035590 A1 | 2/2004 | Richard | |
| 2004/0060695 A1 | 4/2004 | Castano-Mears et al. | |
| 2004/0062497 A1 | 4/2004 | Plemmons et al. | |
| 2004/0071416 A1 | 4/2004 | Militaru | |
| 2004/0252954 A1 | 12/2004 | Ginocchio et al. | |
| 2005/0123254 A1 | 6/2005 | Oh et al. | |
| 2005/0173130 A1 | 8/2005 | Richard | |
| 2005/0205263 A1 | 9/2005 | Richard | |
| 2005/0276551 A1 | 12/2005 | Brown et al. | |
| 2006/0015014 A1 | 1/2006 | Remijan et al. | |
| 2006/0182398 A1 | 8/2006 | Dowd et al. | |
| 2006/0184149 A1 * | 8/2006 | Kasai | A61F 13/15658 604/367 |
| 2008/0180971 A1 * | 7/2008 | Booth | G02B 6/001 362/556 |
| 2008/0271926 A1 | 11/2008 | Coronado et al. | |
| 2008/0310803 A1 | 12/2008 | Franke et al. | |
| 2009/0003780 A1 | 1/2009 | Bringuier et al. | |
| 2009/0034903 A1 | 2/2009 | Herbst | |
| 2009/0103864 A1 | 9/2009 | Hamaskaki et al. | |
| 2009/0223678 A1 | 9/2009 | Richard et al. | |
| 2009/0252463 A1 | 10/2009 | Stoesz et al. | |
| 2009/0252464 A1 | 10/2009 | Stoesz et al. | |
| 2009/0254280 A1 | 10/2009 | Stoesz | |
| 2010/0266249 A1 | 10/2010 | Bonicel et al. | |
| 2011/0058778 A1 * | 3/2011 | Herbst | G01M 5/0091 385/100 |
| 2011/0112410 A1 | 5/2011 | Hirota | |
| 2011/0229099 A1 | 9/2011 | Hartog et al. | |
| 2012/0014652 A1 | 1/2012 | Parris | |
| 2012/0082422 A1 | 4/2012 | Sarchi et al. | |
| 2012/0213483 A1 | 8/2012 | Risch et al. | |
| 2013/0032177 A1 | 2/2013 | Lambert et al. | |
| 2013/0034324 A1 | 2/2013 | Laing et al. | |
| 2013/0051739 A1 | 2/2013 | Stoesz et al. | |
| 2013/0094798 A1 | 4/2013 | Duncan et al. | |
| 2013/0094812 A1 | 4/2013 | Stoesz | |
| 2014/0056553 A1 | 2/2014 | Williger | |
| 2014/0153884 A1 | 6/2014 | Stoesz | |
| 2014/0306100 A1 * | 10/2014 | Saad | G01V 15/00 250/227.11 |
| 2015/0125117 A1 | 5/2015 | Stoesz et al. | |
| 2015/0129751 A1 | 5/2015 | Wysocki et al. | |
| 2016/0040527 A1 | 2/2016 | Balagopal et al. | |

FOREIGN PATENT DOCUMENTS

| | | |
|---|---|---|
| EP | 2770357 A1 | 8/2014 |
| GB | 2020085 A | 11/1979 |
| GB | 2325752 A | 12/1998 |
| JP | 6148440 A | 5/1994 |
| WO | 9919653 A1 | 4/1999 |
| WO | 02099491 A1 | 12/2002 |
| WO | 2007089791 A2 | 8/2007 |
| WO | 2011060060 A2 | 5/2011 |
| WO | 2012122336 A1 | 9/2012 |
| WO | 2012178143 A1 | 12/2012 |
| WO | 20130528206 A1 | 4/2013 |
| WO | 2015073131 A1 | 5/2015 |

OTHER PUBLICATIONS

Dana DuToit et al., "Distributed Fiber Optic Strain and Temperature Sensor forSubsea Umbilical"; International Offshore and Polar Engineering Conference; Jun. 17, 2012; 7 pages.
Extended Search Report for European Application No. 15870579.8, dated Jul. 17, 2018, 8 pages.
Extended Search Report dated Jun. 23, 2016 by the European Patent Office in related EP Patent Application No. 13859456.9, 9 pages.
International Search Report and Written Opinion; dated Jan. 15, 2015, International Application No. PCT/US2014/059000, Korean Intellectual Property Office, International Search Report 6 pages; Written Opinion 5 pages.
J.R. Gage et al., "Fiber optic strain and temperature monitoring in crystalline rock at theSanford Underground Science and Engineering Laboratory (SUSEL),Lead, South Dakota"; American Rock Mechanics Association; ARMA 10-367; Jun. 27, 2010; 8 pages.

(56) References Cited

OTHER PUBLICATIONS

Notification of Transmittal of the International Search Report and the Written Opinion of the International Searching Authority; PCT/US2014/059004; Korean Intellectual Property Office; dated Jan. 9, 2015; 10 pages.
Notification of Transmittal of the International Search Report and the Written Opinion of the International Searching Authority; PCT/US2014/059004; Korean Intellectual Property Office; dated Jan. 9, 2015; ISR 4 pages; WO 6 pages.
Notification of Transmittal of the International Search Report and the Written Opinion; PCT/US2013/067249; Korean Intellectual Property Office; dated Feb. 18, 2014; ISR 3 pages ; WO 5 pages.
Notification of Transmittal of the International Search Report and Written Opinion for International Application No. PCT/US2014/059000; dated Apr. 17, 2017; 11 Pages.
Xihao, et al., "Strain Transfer Capability of Strain Sensing Optical Fiber Cableand Its Measurement Method", International Wire & Cable Symposium, Proceedings of the 57th IWCS, Nov. 9-12, 2008, Providence, Rhode Island; 5 pages.
Yokosuka, et al., "A Low Loss Multifiber Connecter and its Applications", Electronic Components and Technology Conference, May 20, 1990-May 23, 1990, Las Vegas, NV, pp. 865-868, vol. 1.

\* cited by examiner

DISTRIBUTED SENSING SYSTEM EMPLOYING A FILM ADHESIVE

CROSS REFERENCE TO RELATED APPLICATIONS

This application is a continuation and claims the benefit of an earlier filing date from U.S. application Ser. No. 14/077,683 filed Nov. 12, 2013, the entire disclosure of which is incorporated herein by reference.

BACKGROUND

Cables, particularly fiber optic cables, are used ubiquitously in the downhole drilling and completions industry. These cables are used for monitoring a variety of downhole conditions and parameters, such as temperature, vibration, sound, pressure, strain, etc. Due chiefly to their pervasive use, there is an ever-present desire in the industry for alternate configurations of sensing cables, particularly for enhancing the ability to more accurately sense a specific parameter.

SUMMARY

A sensing apparatus includes a sheath, a central member disposed in the sheath, at least one optical fiber disposed with the central member, and a film adhesive disposed between the central member and the sheath, the film adhesive provided in one or more sheets or strips and disposed in one or more layers between the central member and the sheath, and the film adhesive attached to the sheath.

A sensing apparatus includes a sheath, a central member disposed in the sheath, at least one optical fiber disposed between the sheath and the central member, and a film adhesive disposed between the sheath and the central member, the film adhesive provided in one or more sheets or strips and disposed in one or more layers between the central member and the sheath, wherein the at least one optical fiber is attached to the sheath by the film adhesive.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus, system and associated method are presented herein by way of exemplification and not limitation with reference to the Figures. It is to be understood that other embodiments may be utilized and changes may be made without departing from the scope of the present disclosure. In particular, the disclosure provides various examples related to a strain-locked sensing system for use in downhole operations, whereas the advantages of the present disclosure as applied in a related field would be apparent to one having ordinary skill in the art and are considered to be within the scope of the present invention.

Many downhole operations benefit from the use of distributed sensing systems to sense underground parameters such as movement and temperature. These measurements are, in some instances, achieved using optical fibers, typically carried in a metallic sheath. Measuring strain from within the sheath can be challenging, however, because accurate measurements require that any given length of optical fiber is unable to shift or slip relative to the sheath. The attachment of the fiber to the sheath in this manner is sometimes called "strain-locking." In some cases, such as in bend/shape sensing, the fiber must also be located off the central axis of the sheath, which increases the challenge of strain-locking. Furthermore, downhole conditions can reach or exceed 300° C. (572° F.), requiring that the materials selected can withstand such heat and remain strain-locked.

Figure 1:
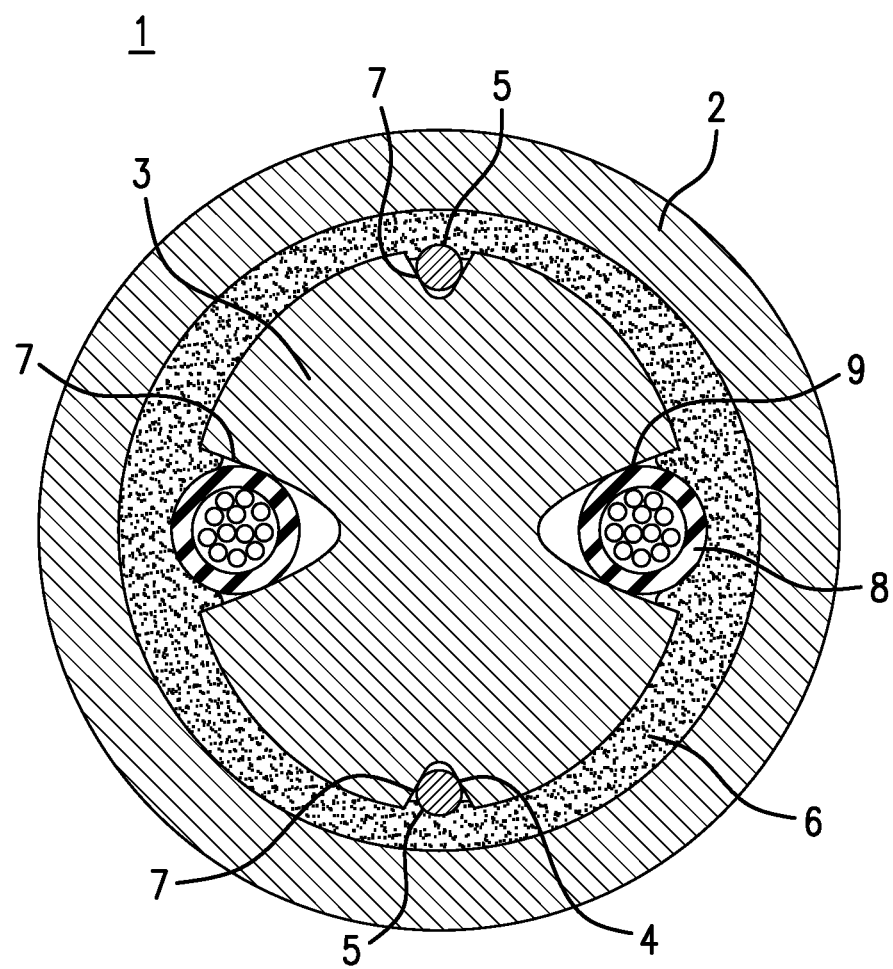
FIG. 1 is a cross-sectional view of a sensing apparatus according to one embodiment.

The present disclosure provides a sensing apparatus and system that includes at least one optical fiber strain-locked to the sheath. FIG. 1 illustrates a cross-sectional view of a sensing apparatus 1 according to one embodiment of the disclosure. A sheath 2 contains a central member 3. The central member 3 comprises at least one channel 4, in which at least one corresponding optical fiber 5 is placed. An adhesive layer 6 is disposed between the sheath 2 and the central member 3. In the illustrated embodiment, the adhesive layer 6 swells to substantially fill void spaces 7. The central member 3 may be configured to contain additional elements such as one or more Fiber in Metal Tube (FIMT) cables 8, as shown in FIG. 1. This is done, for example, by providing one or more additional channels 9 on the surface of the central member 3. These elements, such as FIMT cable 8, can also be strain-locked to the sheath 2 if necessary.

The sheath 2 of the sensing apparatus 1 is provided to protect the cable from the elements and maintain the assembled arrangement of the components. The sheath 2 may be constructed of any material that is suitable for a particular application, such as a metal, polymer or other material. In the example of a distributed sensing system for use in downhole environments, the sheath 2 comprises a metal, such as steel or aluminum. The metal sheath 2 can be made by rolling a long thin sheet of metal and welding it into a tube about the central member that contains the fiber. The thickness of the sheath 2 will to vary by +/−10%.

The one or more optical fibers 5 of the present disclosure are strain-locked with the sheath 2. A radial component of external forces is directly transferred from the sheath 2 to the optical fiber 5, allowing the radial component of the force to be measured using techniques that are commonly known. This arrangement ensures that the one or more optical fibers 5 will be responsive to forces that act on the sheath 2 and which may not otherwise be transferred to the central member 3. The one or more optical fibers 5 may comprise one or more fiber bundles, one or more FIMT cables having one or more optical fibers disposed therein, or another arrangement known in the art. For example, one or more optical fibers 5 are presented in a tube that is disposed on the central member 3. Alternatively, the one or more optical fibers may be embedded inside a hole or groove on or in the central member 3, such as a small hole drilled in a generally axial direction. In any case, a film adhesive may still be used to bind or couple the tube and/or central member 3, as the case may be, to the sheath 2. Where the one or more optical fibers 5 are bound to the tube and/or the central member 3, the one or more optical fibers 5 may still be strain-locked to the sheath.

The central member 3 is a structure that provides support to the optical fiber 5 in a chosen configuration, the shape of which may vary. The central member 3 can be formed of a polymer, ceramic, metal or other material and may be matched to the sheath material in terms of thermal expansion. Also, the central member 3 may comprise a plurality of elements that are assembled together to form a structure. The plurality of elements comprising the central member 3 could be bound prior to introduction into the sheath or may be held together using the film adhesive layer 6 or another adhesive layer. In the illustrated example, the central member 3 is a generally cylindrical member that includes one or more channels 4 on the surface of the central member 3 for receiving one or more optical fibers 5 each. In some embodiments, the channels 4 are arranged in a helical shape or are arranged in parallel with an axis of the central member. Alternatively, the one or more optical fibers 5 are disposed on the surface of the central member 3 rather than in a channel 4. In some embodiments, the channels 4 are sized to support one or more optical fibers 5 such that the one or more optical fibers 5 reside approximately at the radial extent of the central member 3. As used in this disclosure, the term channel is construed to encompass grooves, flutes, trenches, depressions, indentations, or the like formed in the surface of the central member 3 for receiving one or more optical fibers 5.

As stated above, the thickness of the sheath may vary +/−10% based on common manufacturing tolerances. As a result, the sheath 2 may be irregular in shape or have cavities or depressions therein. When assembled with a central member 3, subject to its own tolerances, the irregularities of the annular space formed there between are compounded. As used herein, the term "void" is intended to encompass all such cavities, depressions, gaps, irregularities, and the like.

Figure 2:
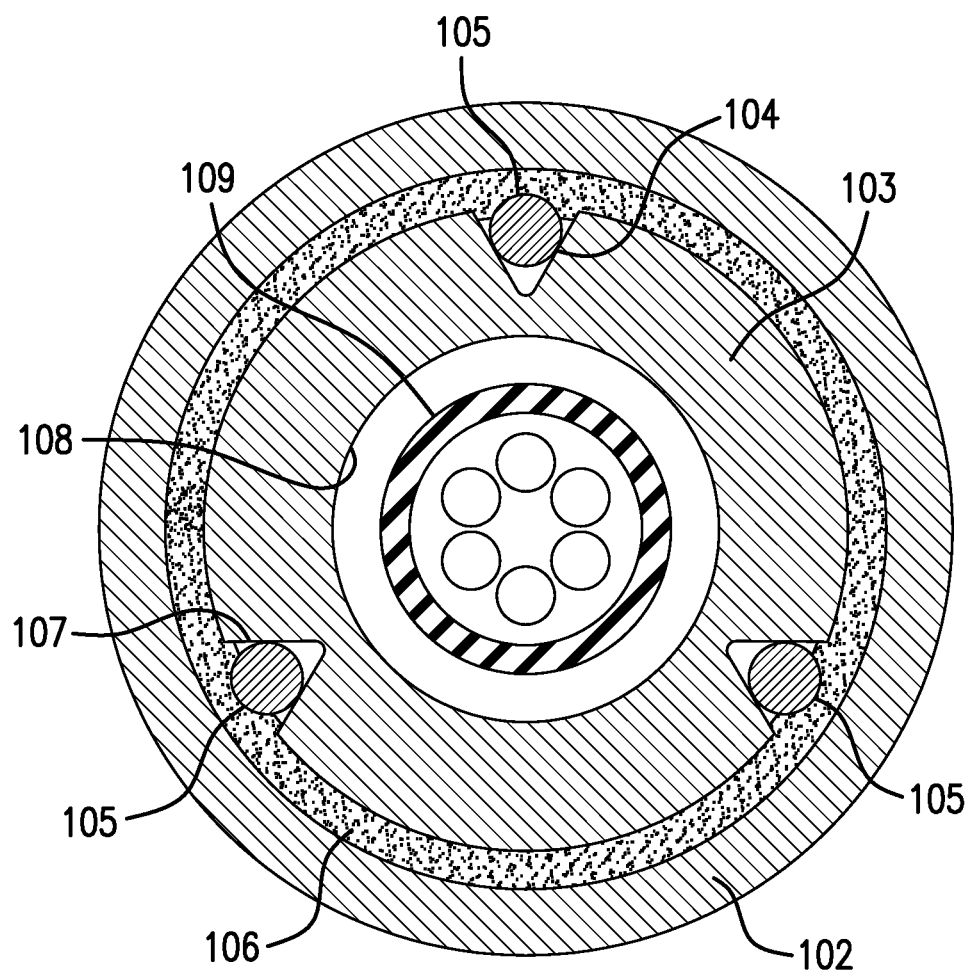
FIG. 2 is a cross-sectional view of a sensing apparatus according to another embodiment.

Other embodiments may comprise any number of central member geometries or number of optical fibers. FIG. 2 illustrates one embodiment having a sheath 102 containing a central member 103. Three channels 104 are formed on an outer surface of the central member 103 with corresponding optical fibers 105 disposed therein. The adhesive layer 106 is disposed between the central member 103 and the sheath 102 and may substantially fill one or more voids 107. Multiple optical fibers 105 may be provided at equal distances along a circumference of the central member 103. The central member 103 is hollow, having a bore 108 formed therein. A bundle 109 is contained in the bore 108, which bundle 109 may comprise a sensing bundle, a FIMT cable, or other device.

Referring again to FIG. 1, the adhesive layer 6 attaches the optical fiber 5 and the underlying central member 3 with the sheath 2. The bond between the adhesive layer 6 and the sheath 2 is required to be very strong in order to withstand variances in strain over short distances. Further, the adhesive must be resilient at high temperatures. In order to fill the annular space between the central member 3 and the sheath 2, it is possible to use a liquid or gel adhesive during the construction of the cable, then curing the adhesive to form a solid structure. Such techniques are known in the art. However, practical issues arise when using liquid adhesives, including difficulty controlling the liquid to not contaminate the weld, containing the adhesive inside a long length of cable, and challenges metering the right amount of adhesive to fill the necessary voids.

The adhesive layer 6 of the present disclosure is formed using a film adhesive. Some examples of such film adhesives comprise partially cured films of epoxy or other material. The film adhesive are provided in sheets or in a strip, such as on a roll of tape, or other available forms. The film adhesive may be provided at a selected thickness for an application. Alternatively, or in combination, a thin film adhesive may be provided and disposed between the central member 3 and the sheath 2 in any number of layers to achieve a desired thickness. The film adhesive is provided, for example, with a thickness of about 0.01 inches or less prior to curing. In one example, the film adhesive is provided with a thickness of about 0.006 inches, for use in a sheath having an outer diameter of about 0.25 inches, the sheath having a radial thickness of about 0.035 inches. Thus, the sheath effectively has a chosen internal diameter of about 0.18 inches.

Figure 3A:
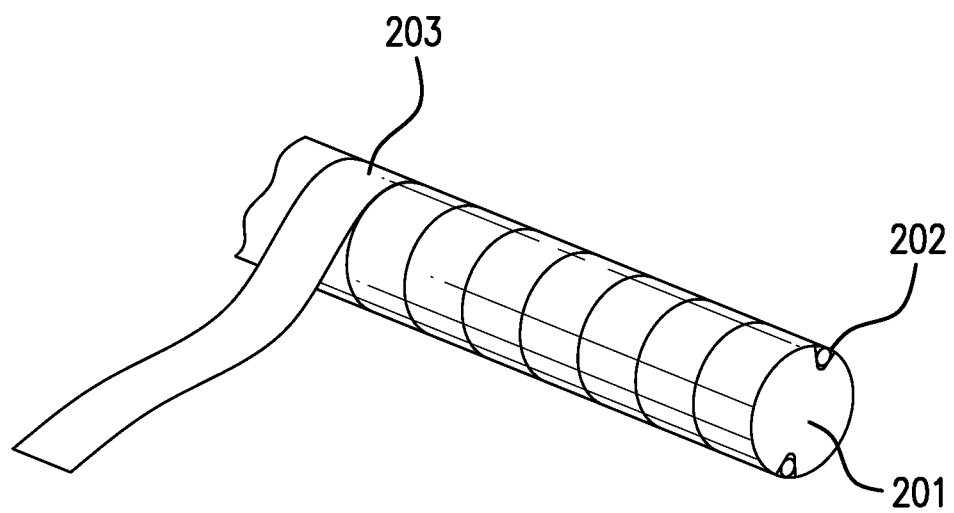
FIGS. 3A and 3B are illustrations depicting an adhesive film being applied to a central member according to additional embodiments.
Figure 3B:
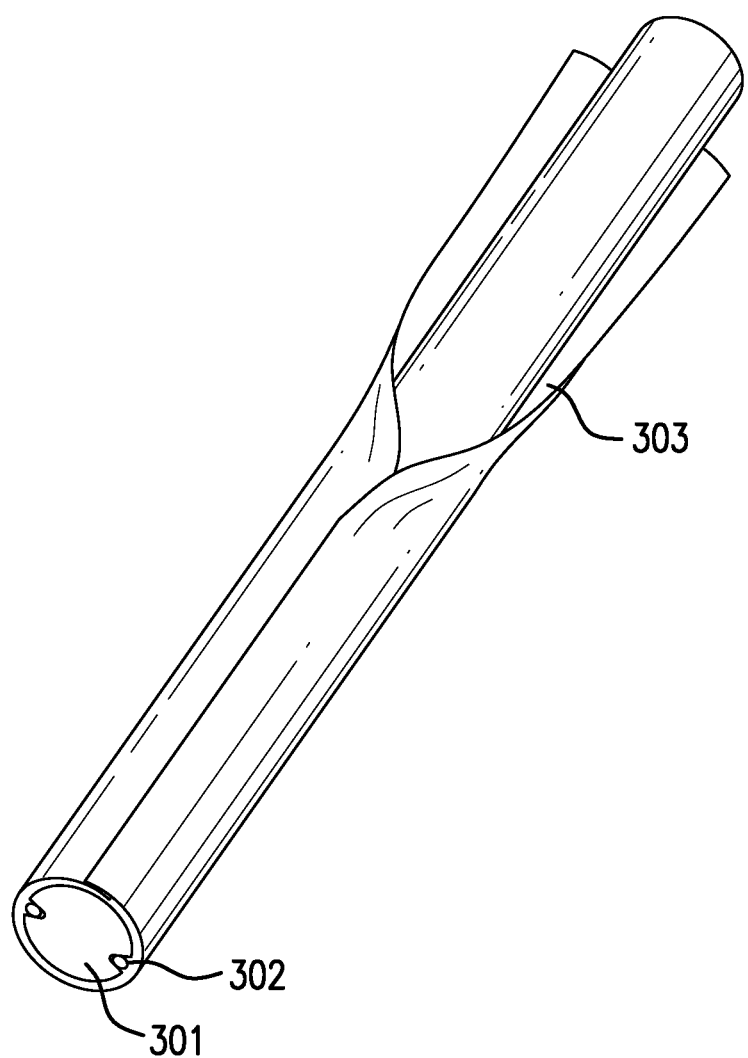

FIGS. 3A and 3B illustrate additional embodiments of a method for forming a sensing apparatus. Referring to FIG. 3A, a central member 201 is provided with a pair of optical fibers 202 disposed thereon. A film adhesive 203 is wrapped circumferentially around the central member 201. The film adhesive 203 may be wrapped in such a manner as to provide a selected thickness of an adhesive layer. The selected thickness may be measured in terms of a radial distance from the center of the central member 201. Alternatively, the film adhesive 203 may be disposed on the sheath material, prior to being rolled and welded to form a tubular structure.

In FIG. 3A, the film adhesive is depicted as being applied circumferentially in a helical pattern. In some embodiments, the film adhesive 203 can be wrapped circumferentially in segments, applied longitudinally along the length of the central member 201. For example, FIG. 3B illustrates a central member 301 and optical fibers 302 that are wrapped longitudinally by a film adhesive 303. A longitudinally applied film adhesive 303 may be applied in a sheet, (as shown), or in individual strips. In other embodiments, the film adhesive 203, 303 may be applied in alternating layers of longitudinally and circumferentially applied films. As may be appreciated, the film adhesive may be disposed in any other arrangement of directions, layers, etc. that results in a consistent and predictable film thickness and such configurations are all within the scope of the present disclosure.

With the film adhesive 203 in place, the sheath is arranged over the central member 201. This is done by placing the central member 201 within the tubular sheath. Alternatively, the sheath is formed and welded around the central member 201.

In some embodiments, the sheath is formed and welded having a first selected internal diameter. The first selected internal diameter is larger than a second selected internal diameter associated with a finished product. The sheath is then extruded, drawn, or otherwise worked to reduce the sheath from the first selected internal diameter to the second selected internal diameter. This process stretches the sheath by a percentage of its overall length, depending on how the sheath is worked. For example, some processes may stretch the sheath by about 30% or more. Unlike the sheath material discussed above, optical fibers 202 do not stretch. In order to avoid damaging the optical fibers 202, an appropriate thickness of the adhesive layer can be selected. As discussed above, where a sheath is drawn down to a selected outer diameter and having an expected radial thickness, the sheath is effectively drawn down to a selected internal diameter.

In one embodiment, the adhesive layer is formed such that the overall thickness of the adhesive layer on top of the central member results in a diameter that is less than the second selected internal diameter of the sheath. In theory, this ensures that the optical fibers 202 will not come into interference with the sheath as it is being stretched. One advantageous feature of some film adhesives 203 is that the film adhesives tend to expand with heat and humidity. As the film adhesive 303 expands during the curing process, it fills any remaining space between the central member 201 and the sheath, and places the optical fiber 202 and central member 201 in a state of compression. This process substantially fills any remaining voids between the sheath and the central member, enhancing the bond between the sheath and the one or more optical fibers 302.

The present disclosure provides examples of a system and apparatus, and a method for making such, having many advantages over current technologies in distributed sensing applications. When used in a downhole environment of high temperature and pressure, the film adhesives discussed above are resilient and provide a strong attachment between the optical fiber and the sheath. The present disclosure may also be useful in other related industries where distributed sensing is used.

While the invention has been described with reference to an exemplary embodiment or embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited. Moreover, the use of the terms first, second, etc., do not denote any order or importance, but rather the terms first, second, etc. are used to distinguish one element from another. Furthermore, the use of the terms a, an, etc. do not denote a limitation of quantity, but rather denote the presence of at least one of the referenced item.

Set forth below are some embodiments of the foregoing disclosure:

Embodiment 1

A sensing apparatus including a sheath, a central member disposed in the sheath, at least one optical fiber disposed with the central member, and a film adhesive disposed between the central member and the sheath, the film adhesive provided in one or more sheets or strips and disposed in one or more layers between the central member and the sheath, and the film adhesive attached to the sheath.

Embodiment 2

The sensing apparatus as in any prior embodiment, wherein the film adhesive has an overall adhesive thickness that attaches the sheath to the central member.

Embodiment 3

The sensing apparatus as in any prior embodiment, wherein the at least one optical fiber is attached to the sheath by the film adhesive.

Embodiment 4

The sensing apparatus as in any prior embodiment, wherein the at least one optical fiber is strain locked with respect to the sheath by the film adhesive.

Embodiment 5

The sensing apparatus as in any prior embodiment, wherein the at least one optical fiber is responsive to forces that act on the sheath.

Embodiment 6

The sensing apparatus as in any prior embodiment, wherein the central member includes at least one channel formed on a surface thereof, the at least one optical fiber disposed in the at least one channel.

Embodiment 7

The sensing apparatus as in any prior embodiment, wherein the at least one channel and the at least one optical fiber are arranged in a helical shape.

Embodiment 8

The sensing apparatus as in any prior embodiment, wherein the film adhesive is circumferentially wrapped around the central member.

Embodiment 9

The sensing apparatus as in any prior embodiment, wherein the film adhesive substantially fills a void between the at least one optical fiber and the sheath.

Embodiment 10

The sensing apparatus as in any prior embodiment, wherein the film adhesive expands to fill the void when cured.

Embodiment 11

A distributed sensing system including the sensing apparatus as in any prior embodiment, wherein the system is deployed in a well.

Embodiment 12

The system as in any prior embodiment, wherein the sheath is coupled to a production tubing or casing.

Embodiment 13

A method for preparing the sensing apparatus as in any prior embodiment, the method including disposing the at least one optical fiber on the central member, applying the film adhesive onto the central member, arranging a sheath over the film adhesive and central member, and drawing down the sheath.

Embodiment 14

The method as in any prior embodiment, wherein disposing the at least one optical fiber on the central member includes disposing the at least one optical fiber in a channel on a periphery of the central member.

Embodiment 15

The method as in any prior embodiment, wherein applying the film adhesive onto the central member is performed by circumferentially wrapping the film adhesive around the central member or by applying the film adhesive longitudinally along the central member.

Embodiment 16

The method as in any prior embodiment, wherein the sheath is drawn down to a selected internal diameter, and a radius of the applied film adhesive is less than the selected internal diameter.

Embodiment 17

The method as in any prior embodiment, further comprising curing the film adhesive, wherein curing the film adhesive causes the film adhesive to expand and substantially fill a plurality of voids between the central member and the sheath.

Embodiment 18

A sensing apparatus including a sheath, a central member disposed in the sheath, at least one optical fiber disposed between the sheath and the central member, and a film adhesive disposed between the sheath and the central member, the film adhesive provided in one or more sheets or strips and disposed in one or more layers between the central member and the sheath, wherein the at least one optical fiber is attached to the sheath by the film adhesive.

Embodiment 19

The sensing apparatus as in any prior embodiment, wherein the sheath is strain locked to the at least one optical fiber by the film adhesive.

Embodiment 20

The sensing apparatus as in any prior embodiment, wherein the film adhesive includes an overall adhesive thickness in contact with both the sheath and the central member.

The use of the terms "a" and "an" and "the" and similar referents in the context of describing the invention (especially in the context of the following claims) are to be construed to cover both the singular and the plural, unless otherwise indicated herein or clearly contradicted by context. Further, it should further be noted that the terms "first," "second," and the like herein do not denote any order, quantity, or importance, but rather are used to distinguish one element from another. The modifier "about" used in connection with a quantity is inclusive of the stated value and has the meaning dictated by the context (e.g., it includes the degree of error associated with measurement of the particular quantity).

The teachings of the present disclosure may be used in a variety of well operations. These operations may involve using one or more treatment agents to treat a formation, the fluids resident in a formation, a wellbore, and/or equipment in the wellbore, such as production tubing. The treatment agents may be in the form of liquids, gases, solids, semi-solids, and mixtures thereof. Illustrative treatment agents include, but are not limited to, fracturing fluids, acids, steam, water, brine, anti-corrosion agents, cement, permeability modifiers, drilling muds, emulsifiers, demulsifiers, tracers, flow improvers etc. Illustrative well operations include, but are not limited to, hydraulic fracturing, stimulation, tracer injection, cleaning, acidizing, steam injection, water flooding, cementing, etc.

While the invention has been described with reference to an exemplary embodiment or embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the claims. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited.

The invention claimed is:

1. A sensing apparatus, comprising:
   an outer sheath;
   a central member disposed in the sheath, the central member including at least one channel;
   at least one optical fiber disposed with the central member in the at least one channel; and
   a film adhesive disposed between the central member and the sheath and at least partially covering the at least one optical fiber, the film adhesive provided in one or more sheets or strips and disposed in one or more layers between the central member and the sheath, and the film adhesive attaching the optical fiber to the central member and the outer sheath, wherein the at least one optical fiber is strain locked with respect to the outer sheath by the film adhesive.

2. The sensing apparatus of claim 1, wherein the film adhesive has an overall adhesive thickness that attaches the sheath to the central member.

3. The sensing apparatus of claim 1, wherein the at least one optical fiber is responsive to forces that act on the outer sheath.

4. The sensing apparatus of claim 1, wherein the at least one channel and the at least one optical fiber are arranged in a helical shape.

5. The sensing apparatus of claim 1, wherein the film adhesive is circumferentially wrapped around the central member.

6. The sensing apparatus of claim 1, wherein the film adhesive substantially fills a void between the at least one optical fiber and the outer sheath.

7. The sensing apparatus of claim 6, wherein the film adhesive expands to fill the void when cured.

8. A distributed sensing system including the sensing apparatus of claim 1, wherein the system is deployed in a well.

9. The system of claim 8, wherein the sheath is coupled to a production tubing or casing.

10. A method for preparing the sensing apparatus of claim 1, the method comprising:
    disposing the at least one optical fiber in a channel on the central member;
    applying the film adhesive onto the central member and at least partially covering the at least one optical fiber;
    arranging an outer sheath over the film adhesive and central member; and drawing down the outer sheath onto the film adhesive strain locking the at least one optical fiber thereto.

11. The method of claim 10, wherein applying the film adhesive onto the central member is performed by circumferentially wrapping the film adhesive around the central member or by applying the film adhesive longitudinally along the central member.

12. The method of claim 10, wherein the outer sheath is drawn down to a selected internal diameter, and a radius of the applied film adhesive is less than the selected internal diameter.

13. The method of claim 10, further comprising curing the film adhesive, wherein curing the film adhesive causes the film adhesive to expand and substantially fill a plurality of voids between the central member and the outer sheath.

* * * * *